United States Patent [19]
Simon

[11] 3,828,943
[45] Aug. 13, 1974

[54] DRILL ROD HANDLING APPARATUS
[75] Inventor: Karlheinz A. Simon, Seattle, Wash.
[73] Assignee: Ingersoll-Rand Company, Woodcliff Lake, N.J.
[22] Filed: Oct. 15, 1973
[21] Appl. No.: 406,606

[52] U.S. Cl. ................. 214/2.5, 214/1 BC, 175/85
[51] Int. Cl. ........................................... E21b 19/00
[58] Field of Search ........ 214/2.5, 1 P, 1 BC, 1 BD; 175/85, 52

[56] References Cited
UNITED STATES PATENTS

| | | | |
|---|---|---|---|
| 3,177,944 | 4/1965 | Knights | 214/2.5 X |
| 3,182,813 | 5/1965 | Goodell et al. | 214/1 BD |
| 3,336,991 | 8/1967 | Klem et al. | 214/2.5 X |
| 3,506,075 | 4/1970 | Attebo | 214/2.5 X |
| 3,734,208 | 5/1973 | Otto | 214/2.5 |
| 3,773,188 | 11/1973 | Arrington | 214/2.5 |

Primary Examiner—Allen N. Knowles
Attorney, Agent, or Firm—Bernard J. Murphy

[57] ABSTRACT

The apparatus comprises means, for use with an earth drilling machine, effecting powered handling of drill rods for moving drill rods from an earth drilling machine to a horizontal storage position, and vice versa. The primary components of the apparatus comprise powered, parallel, double-linkage arms for moving drill rods, by means of gripping assemblies carried by the arms, in a vertical disposition, or in inclined dispositions: from vertical to 30° from horizontal, through an arc between a location alongside the machine, and a location within the machine (for alignment therein of the drill rod with a drill head or drill rod string). Included is an elevating, powered, tilt cradle having a platform for receiving a drill rod horizontally thereupon. The cradle has uprights set on one side thereof to prevent drill rods from sliding off the platform. Additionally, the cradle has a stop which abuts the lowermost portion of the drill rod to prevent axial displacement of the rod on the cradle. The stop also correctly positions the drill rod, longitudinally on the cradle, for a proper clasping of the drill rod by the gripping assemblies. Further, the cradle has a two-part, pin-type closure, webbed strap to aid in securing the cradle-borne rods.

15 Claims, 6 Drawing Figures

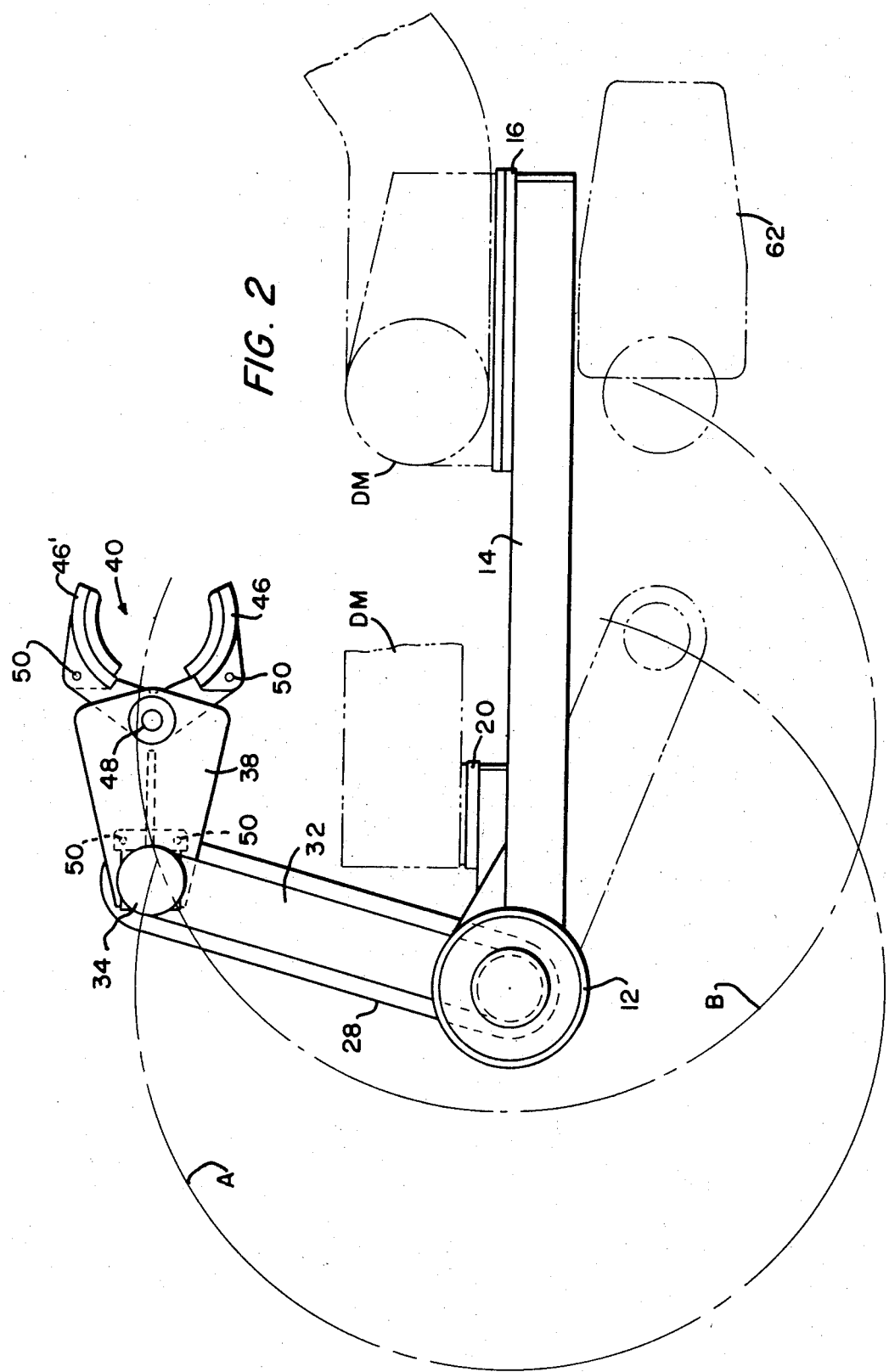

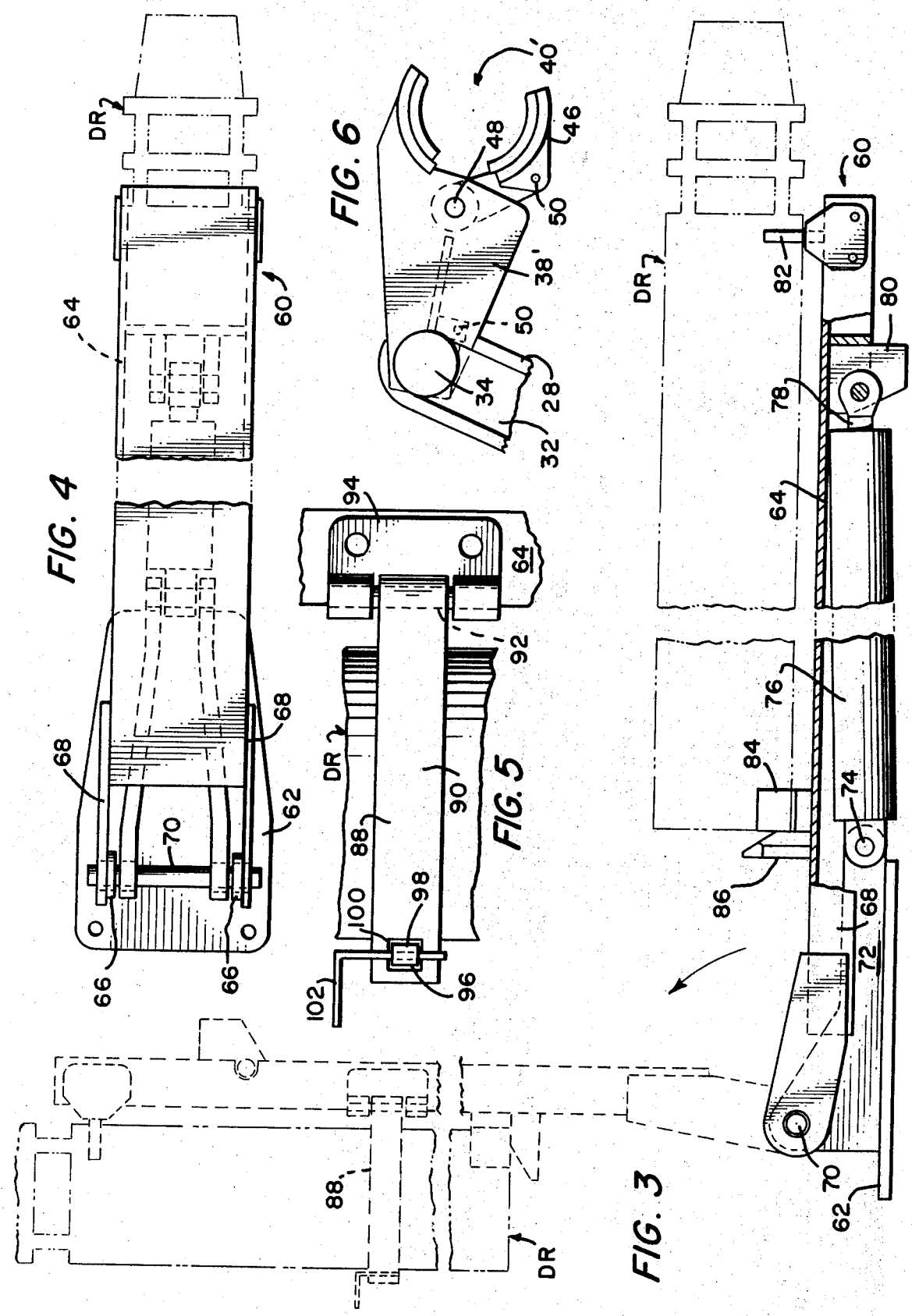

DRILL ROD HANDLING APPARATUS

This invention pertains to drill rod handling apparatus, and in particular to an apparatus which effects powered handling of drill rod substantially independently of any ancillary power equipment.

In underground raise drill operations the raise drilling machine turns a long drill rod stem consisting of five-foot-long drill rod sections which are successively added in the typical pilot drill operation, and successively removed in the raise drill operation.

These five foot sections, the drill rods, weigh approximately 800 lbs. each; some special rods, i.e., stabilizers, weigh as much as 1500 lbs. According to prior art practices, each of these drill rods has to be hoisted into and out of the raise drill machine, and be further positioned by a hoist for threading thereof to the drill stem (or unthreaded therefrom, depending upon the operation).

It is an object of this invention to set forth an apparatus capable of a convenient and economical way of rod handling, where drill rods laying on the ground are rolled into a device in which they are elevated, and where the rods are then clasped and placed into the machine, in a pilot drill operation, and removed and placed in horizontal storage in the raise drill operation.

It is a particular object of this invention to teach a drill rod handling apparatus, for use with earth drilling machines, comprising a shaft having a longitudinal axis, rotary actuator means coupled to said shaft for rotating said shaft on said axis; means for releasably gripping drill rods; and means coupling said gripping means to said shaft to cause said gripping means to rotate in common with said shaft; wherein said coupling means includes means for causing said gripping means to track an orbital path about said axis which has both a perigee and an apogee, to effect movement of said gripping means into greater and lesser proximity to said axis.

A feature of this invention comprises means, for use with an earth drilling machine effecting powered handling of drill rods for moving drill rods from an earth drilling machine to a horizontal storage position, and vice versa. The primary components of the apparatus comprise powered, parallel, double-linkage arms for moving drill rods, by means of gripping assemblies carried by the arms, in vertical or inclined dispositions, through an arc between a location alongside the machine, and a location within the machine (for alignment therein of the drill rod with a drill head or drill rod string). Included is an elevating, powered, tilt cradle having a platform for receiving a drill rod horizontally thereupon. The cradle has uprights set on one side thereof to prevent drill rods from sliding off the platform. Additionally, the cradle has a stop which abuts the lowermost portion of the drill rod to prevent axial displacement of the rod on the cradle. The stop also correctly positions the drill rod, longitudinally on the cradle, for a proper clasping of the drill rod by the gripping assemblies. Further, the cradle has a two-part, pin-type closure, webbed strap to aid in securing the cradle-borne rods.

Further objects and features of this invention will become more apparent by reference to the following description taken in conjunction with the accompanying figures, in which:

FIG. 2 is a plan view of the embodiment of FIG. 1; wherein both FIGS. 1 & 2 depict the apparatus replaceably mounted to one side of the associated (phantom-view) earth drilling machine.

FIG. 3 is a side, elevational view of the powered, drill rod handling cradle;

FIG. 4 is a plan view of the cradle of FIG. 3.

FIG. 5 is a side elevation of a portion of the cradle and a drill rod, showing the two-piece webbed strap; and FIG. 6 is a plan view of an alternate embodiment of a gripper assembly, according to the invention.

Figure 1:
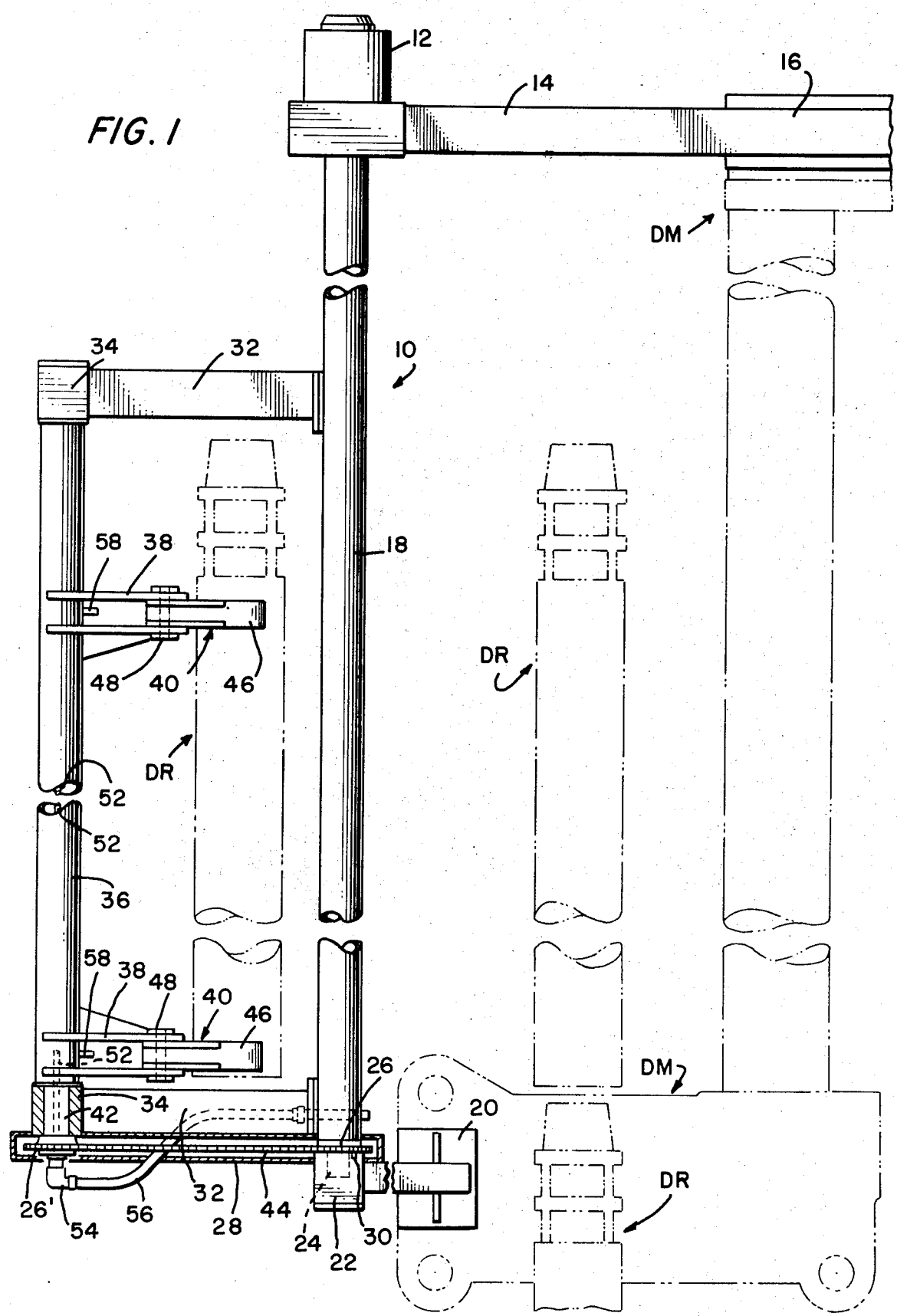
FIG. 1 is an elevational view, partly in cross-section of an embodiment of a drill rod handling apparatus, according to the invention, in association with a phantomed earth drilling machine and phantomed drill rod.

As shown in the figures, the apparatus 10 comprises a rotary actuator 12 supported on a horizontal member 14 at one end thereof which member carries a mounting bracket 16 at the other end thereof for replaceable fastening thereof to the drilling machine "DM," by means of hardware (not shown). Actuator 12 powers a rotatable primary shaft 18, the shaft being supported at the lowermost portion of the apparatus 10 in a further mounting bracket 20 used for replaceable mounting of the apparatus to the earth drilling machine DM.

Bracket 20 carries a journal 22 in which a stub end 24 of primary shaft 18 is rotatably supported (in a bearing, not shown). A sprocket wheel 26 is enclosed within a housing 28, toward the lower end of the apparatus 10, and is fixed, by a pin 30, to journal 22, to prevent its rotation.

Shaft 18 has a pair of primary arms 32 integrally fixed thereto at one end of said arms, the opposite ends of the arms terminating in bearing sleeves 34. Sleeves 34 rotatably support a secondary shaft 36, at either ends of the latter.

A parallel pair of secondary arms 38 are integrally fixed at one end thereof to the secondary shaft 36, and each carries a gripper assembly 40 at the opposite end thereof.

A secondary sprocket wheel 26' is integrally fixed to a stub end 42 of the secondary shaft 36, and an endless chain 44 is fixed in engagement with both wheels 26 and 26'. Wheels 26 and 26' are of one, common diameter. Accordingly, as primary shaft 18 is rotated, by actuator 12, arms 32 cause the secondary shaft 36 to slue through the arc A of FIG. 2. At the same time, the sprocket wheels 26 and 26' and chain 44 cause the secondary shaft 36 to rotate in sleeves 34. Thus, drill rod grippers 46, of assemblies 40, are slued through a displaced (relative to arc A) arc B (FIG. 2).

Each assembly 40 has a pair of grippers 46 and 46' or jaws pivotally joined to respective secondary arms 38 via pivot pins 48. Arms 38 and grippers 46 and 46' have mounting holes 50 for the coupling therebetween of hydraulic actuators (or the like) for selectively opening and closing grippers 46 and 46' about a drill rod "DR" (FIG. 1). Such hydraulic actuation coupling arrangements notorious in this art, thus depiction thereof is deemed to be unnecessary. Shaft 36 is hollow, to accommodate therewithin a hydraulic fluid line 52 which, via an elbow 54 is supplied fluid from a supply line 56 (coupled to a source not shown). Branch lines 58, borne by arms 38 and in communication with line 52, terminate whereat actuators would be operatively coupled thereto.

The powered tilt cradle 60, comprised by the apparatus 10, is illustrated in FIGS. 3 and 4, while its mounting base 62 is shown in phantom in FIG. 2 to disclose the emplacement and cooperative relationship of the cradle 60 relative to the other components of the apparatus 10.

Cradle 60 comprises an elongate platform 64 for receiving a drill rod DR. Base 62 has a stanchion 66 to which a pair of platform-supporting limbs 68 are pivotally joined by a pivot pin 70. Stanchion 66 and pin 70 also mount a fixed yoke 72 which pivotally receives a first end 74 of a power cylinder 76. The opposite end of the cylinder, from which a translatable piston rod 78 projects, is pivotally coupled, via the rod 78 end, to a gusset 80 extending from and integral with platform 64.

By powering cylinder 76 (with hydraulic fluid by lines and from a supply not shown) to cause reciprocation of rod 78, platform 64 is moved between the horizontal disposition shown in full-line illustration and the disposition shown in dashed-line illustration. Thus, drill rod DR disposed on platform 64 is moved to and from the grippers 46 and 46' of assemblies 40. Uprights 82 and 84, fixed to one side of the platform 64, restrain the drill rod DR from sliding off the platform, while a foot stop 86 prevents the drill rod DR from sliding axially and correctly positions the drill rod for optimum grasp thereof by the assemblies 40. Further, a two-part webbed strap 88 (FIG. 5) is used to restrain the rod DR. One part 90 of the strap is pivotally secured at 92 to a bracket 94 fixed to the platform 64. The other strap part 96 has a bored through terminal tongue 98 which is received in an aperture 100 and secured thereat with a latching pin 102.

In operation, a drill rod is placed (hoisted or rolled) into the tilt cradle 60 which is attached (by means not shown) alongside the drilling machine DM. The cylinder 76 tilts the platform 64 up. The drill rod DM is kept in the cradle 60 by the strap 88 and by gravity. The tilt cradle positions the drill rod into the two appropriately-positioned assemblies 40. These assemblies 40 grasp the rod at its upper and lower ends. The primary arms 32 slue approximately 270° of arc. The secondary arms 38 remain always parallel to the drilling machine DM but rotate relative to the primary arms and "through" them. This is accomplished by the two sprocket wheels 26 and 26' and chain 44. The drill rod, rotated into the machine this way, is positioned right in line with a drill stem and/or directly under a chuck or drill head. From here it can be easily threaded to such a drill stem and/or chuck.

When the drill rod is to be removed from the drilling machine DM, it is gripped after the upper and lower threads are untightened and the lower end is unscrewed. Te drill rod is held in place by the assemblies 40 while the drilling machine completes the unthreading cycle at the upper connection. Once the drill rod DR is disconnected, it is rotated out of the machine by arms 32 and 28. At the end position cradle 60 tilts up to receive the drill rod and lower it to where it can be moved away.

In an alternate embodiment of the invention, gripper assemblies 40' (FIG. 6) (only one being shown) are used in lieu of assemblies 40 (FIGS. 1, 2). Assemblies 40' are substantially similar to the others; except that they employ but one movable gripper or jaw 46. The alternate assembly 40' has a modified secondary arm 38' in which a terminal end thereof defines an integral gripper or jaw; the latter complements the one movable gripper or jaw 46.

This novel apparatus 10 has the following advantages:

1. Handling and placing of drill rods from "ground on up".
2. Adaption to any drill angle position of the drill machine DM. (The pivot point of tilt cradle lines up with main pivot point of machine).
3. The apparatue can be placed on and be made operative on either side of the drilling machine.
4. The "double pivot" arrangement of the apparatus arms 32 and 38 does not need much space for operation compared to single pivot arm rod handling apparatus. Thus this apparatus can operate in relatively small envelopes. Also, because the reactive torque applies to the primary arms 32, the torque is kept low and only a small rotary actuator 12 is needed (compared to what would be required if a single pivot arm were employed).
5. Backlash in the chain drive allows for manual "corrective" positioning of drill rod under a chuck.

While I have described my invention in connection with specific embodiments thereof it is to be clearly understood that this is done only by way of example and not as a limitation to the scope of my invention as set forth in the objects thereof and in the appended claims.

I claim:

1. Drill rod handling apparatus, for use with earth drilling machines, comprising:
   a shaft having a longitudinal axis;
   rotary actuator means coupled to said shaft for rotating said shaft on said axis;
   means for releasably gripping drill rods; and
   means coupling said gripping means to said shaft to cause said gripping means to rotate in common with said shaft; wherein
   said coupling means includes means for causing said gripping means to track an orbital path about said axis which has both a perigee and an apogee, to effect movement of said gripping means into greater and lesser proximity to said axis.

2. An apparatus, according to claim 1, wherein:
   said coupling means comprises primary arm means coupled at one end thereof to said shaft and extends radially therefrom, supporting an elongate beam at the other end thereof; and
   secondary arm means coupled at one end thereof to said beam, and extending radially therefrom, having said gripping means mounted to the other end thereof.

3. An apparatus, according to claim 2, further including:
   first journal means supporting said shaft for rotation; and wherein
   said coupling means further comprises second journal means supporting said beam for rotation, and
   means interconnecting said beam and said first journal means for causing rotation of said beam coincident with rotation of said shaft.

4. An apparatus, according to claim 2, wherein:

said one end of said second arm means and said beam are integrally coupled together to prevent relative rotation therebetween.

5. An apparatus, according to claim 2, further including:
first journal means supporting said shaft for rotation; and wherein
said coupling means further comprises second journal means supporting said beam for rotation; and means interconnecting said beam and said first journal means for causing rotation of said beam coincident with rotation of said shaft;
said one end of said second arm means and said beam are integrally coupled together to prevent relative rotation therebetween; wherein
said beam has a rotary axis; and
said integral coupling and said interconnecting means cooperate to cause said secondary arm means to move along an orbital path, relative to said rotary axis of said beam, in response to rotation of said beam.

6. An apparatus, according to claim 2, further including:
first journal means supporting said shaft for rotation; and wherein
said coupling means further comprises second journal means supporting said beam for rotation; and means interconnecting said beam and said first journal means for causing rotation of said beam coincident with rotation of said shaft;
said one end of said second arm means and said beam are integrally coupled together to prevent relative rotation therebetween; and wherein
said integral coupling and said interconnecting means cooperate to cause said secondary arm means to slue through an arc which traverses an intermediate portion of said primary arm means.

7. An apparatus, according to claim 3, wherein:
said interconnecting means comprises a sprocket integrally joined to said beam for rotation therewith and a chain having a section therein in engagement with a peripheral portion of said sprocket, said chain having two lengths of filamentary portion integral with said section which extend from said sprocket and are secured to said first journal means to prevent linear travel of said chain lengths or portions.

8. An apparatus, according to claim 7, wherein:
said chain defines an endless loop;
said first journal means includes a second sprocket fixed against rotation; and
a second section of said chain is engaged with a peripheral portion of said second sprocket.

9. An apparatus, according to claim 1, wherein:
said gripping means comprises means for releasably gripping drill rod at a plurality of spaced-apart locations along said drill rods.

10. An apparatus, according to claim 2, wherein:
said primary arm means comprises a plurality of parallel arms; and
said gripping means comprises a plurality of pairs of jaws or clamps;
a pair of said jaws or clamps being mounted to each of said arms; and
at least one of said jaws or clamps of each said pair is pivotally mounted to its respective arm.

11. An apparatus, according to claim 1, further including:
bracket means coupled to said shaft for mounting said apparatus onto an earth drilling machine.

12. An apparatus, according to claim 3, wherein:
said first journal means comprises a pair of shaft journals;
said shaft being supported at each axial end thereof by a journal of said pair; and
said journals each have brackets integral therewith for mounting said apparatus to an earth drilling machine.

13. An apparatus, according to claim 1, further including:
means for supporting and moving a drill rod between horizontal and vertical dispositions thereof to retrieve drill rods from, and to advance drill rods to said gripping means,
said drill rod supporting and moving means having an elongate platform; and
said platform having means for restraining drill rods supported thereby from lateral displacement.

14. An apparatus, according to claim 1, further including:
means for supporting and moving a drill rod between horizontal and vertical dispositions thereof to retrieve drill rods from, and to advance drill rods to said gripping means;
said drill rod supporting and moving means having an elongate platform; and
said platform having means for restraining drill rods supported thereby from longitudinal displacement.

15. Drill rod handling apparatus, for use with earth drilling machines, comprising:
a shaft having a longitudinal axis;
means supporting said shaft for rotation about said axis;
means for releasably gripping drill rods; and
means coupling said gripping means to said shaft, to cause said gripping means to rotate in common with said shaft; wherein
said coupling means includes means for causing said gripping means to track an orbital path about said axis which has both a perigee and an aporgee, to effect movement of said gripping means into greater and lesser proximity to said axis.

* * * * *

PO-1050
(5/69)

UNITED STATES PATENT OFFICE
CERTIFICATE OF CORRECTION

Patent No. 3,828,943      Dated 13 August 1974

Inventor(s) Karlheinz A. Simon

It is certified that error appears in the above-identified patent and that said Letters Patent are hereby corrected as shown below:

Column 5, claim 7, line 6, "of filamentary portion" should read --of filamentary portions--.

Signed and sealed this 10th day of December 1974.

(SEAL)
Attest:

McCOY M. GIBSON JR.          C. MARSHALL DANN
Attesting Officer             Commissioner of Patents

PO-1050
(5/69)

UNITED STATES PATENT OFFICE
CERTIFICATE OF CORRECTION

Patent No. 3,828,943                    Dated    13 August 1974

Inventor(s)    Karlheinz A. Simon

It is certified that error appears in the above-identified patent and that said Letters Patent are hereby corrected as shown below:

Column 5, claim 7, line 6, "of filamentary portion" should read --or filamentary portions--.

This certificate supersedes Certificate of Correction issued December 10, 1974.

Signed and Sealed this twenty-ninth Day of July 1975

[SEAL]

Attest:

RUTH C. MASON
Attesting Officer

C. MARSHALL DANN
Commissioner of Patents and Trademarks